(12) United States Patent  
Seo et al.

(10) Patent No.: US 7,835,629 B2
(45) Date of Patent: Nov. 16, 2010

(54) RECORDING MEDIUM HAVING DATA STRUCTURE WITH REAL-TIME NAVIGATION INFORMATION FOR MANAGING REPRODUCTION OF VIDEO DATA RECORDED THEREON AND RECORDING AND REPRODUCING METHODS AND APPARATUSES

(75) Inventors: Kang Soo Seo, Kyunggi-do (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1091 days.

(21) Appl. No.: 10/614,184

(22) Filed: Jul. 8, 2003

(65) Prior Publication Data

US 2005/0019013 A1 Jan. 27, 2005

(30) Foreign Application Priority Data

Jul. 9, 2002 (KR) ...................... 10-2002-0039548

(51) Int. Cl.
H04N 5/00 (2006.01)
H04N 5/91 (2006.01)
H04N 7/00 (2006.01)

(52) U.S. Cl. ........................ 386/126; 386/46; 386/95; 386/98; 386/123; 386/125

(58) Field of Classification Search .................. 386/45, 386/95, 125–126, 46, 98, 123
See application file for complete search history.

(56) References Cited

U.S. PATENT DOCUMENTS

| 5,602,920 | A | * | 2/1997 | Bestler et al. ............... 380/212 |
| 5,870,523 | A | * | 2/1999 | Kikuchi et al. ................ 386/95 |
| 6,064,796 | A | * | 5/2000 | Nakamura et al. .......... 386/131 |
| 6,304,717 | B1 | * | 10/2001 | Fujinami ..................... 386/111 |
| 6,377,518 | B1 | * | 4/2002 | Auwens et al. ........... 369/30.04 |
| 7,000,246 | B1 | * | 2/2006 | Takao ......................... 725/141 |
| 7,020,384 | B1 | * | 3/2006 | Kim et al. ..................... 386/95 |

(Continued)

FOREIGN PATENT DOCUMENTS

JP 10-074379 3/1998

(Continued)

OTHER PUBLICATIONS

Notice of Allowance for Korean patent application No. 10-2002-0039548 dated Jan. 29, 2009.

(Continued)

Primary Examiner—Thai Tran
Assistant Examiner—Daquan Zhao
(74) Attorney, Agent, or Firm—Harness, Dickey & Pierce, P.L.C.

(57) ABSTRACT

A recording medium having a data structure for managing reproduction of video data recorded on the recording medium. The recording medium having at least one navigation area for storing navigation management information used in managing real-time reproduction path video data recorded on the recording medium. The navigation management information includes at least one navigation unit that includes a plurality of video data packets and a plurality of real-time navigation packets.

19 Claims, 7 Drawing Sheets

U.S. PATENT DOCUMENTS

| | | | |
|---|---|---|---|
| 7,103,268 B2 * | 9/2006 | Watanabe | 386/125 |
| 2002/0106197 A1 * | 8/2002 | Boyle | 386/111 |
| 2004/0088739 A1 * | 5/2004 | Shimoji et al. | 725/135 |

FOREIGN PATENT DOCUMENTS

| | | |
|---|---|---|
| JP | 11-018054 | 1/1999 |
| KR | 10-2001-0106847 A | 12/2001 |
| KR | 10-2001-0109824 A | 12/2001 |

OTHER PUBLICATIONS

Office Action issued Aug. 25, 2008 by the Korean Patent Office in Korean Patent App. No. 10-2002-0039548.

* cited by examiner

RECORDING MEDIUM HAVING DATA STRUCTURE WITH REAL-TIME NAVIGATION INFORMATION FOR MANAGING REPRODUCTION OF VIDEO DATA RECORDED THEREON AND RECORDING AND REPRODUCING METHODS AND APPARATUSES

BACKGROUND OF THE INVENTION

1. Field of the Invention

A recording medium having a data structure for managing reproduction of video data recorded on the recording medium. The recording medium having at least one navigation area for storing navigation management information used in managing real-time reproduction path video data recorded on the recording medium. The navigation management information includes at least one navigation unit that includes a plurality of video data packets and a plurality of real-time navigation packets.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

Figure 1:
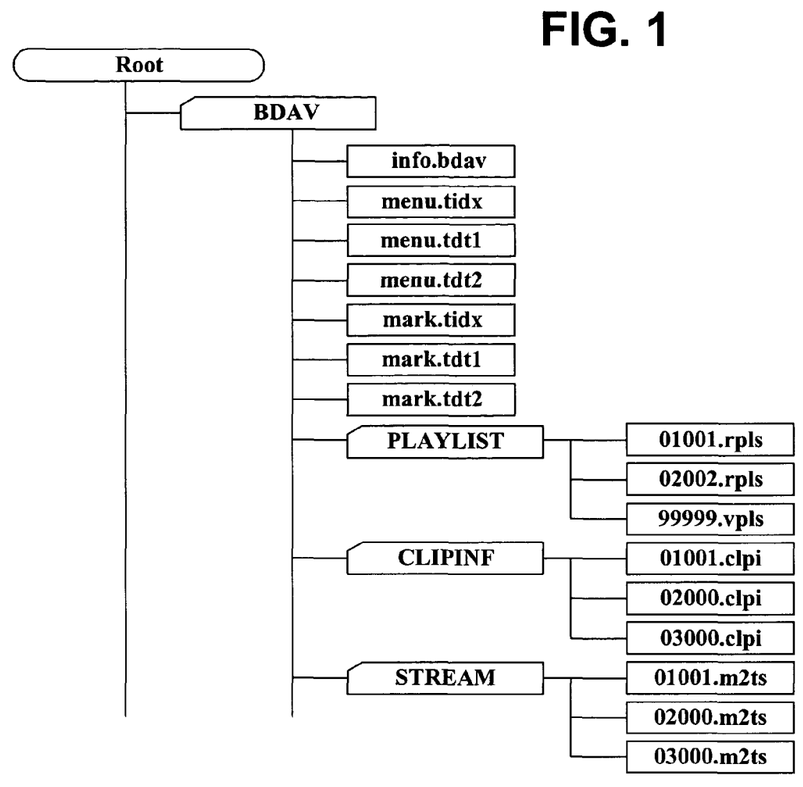
FIG. 1 illustrates the prior art or data structure of a rewritable optical disk according to the Blu-ray Disc Rewritable (BD-RW) standards.

FIG. 1 illustrates the file structure of the BD-RW. The file structure or data structure provides for managing the reproduction of the video and audio data recorded on the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence. Each of the transport Packets (TPs) has a recording size of 188 bytes. Real-time navigation data serving as management information for reading/reproducing the A/V data stream recorded with the transport packets is also recorded with MPEG2 transport packets each having a recording size of 188 bytes.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

Recently, although many developers have conducted intensive research into the high-density rewritable optical disk such as a BD-ROM disk and its standardization, they have not provided users with any solution for recording/managing real-time navigation data adapted to more efficiently read/reproduce the A/V data stream recorded on the BD-ROM, such that there is a need for the developers to provide users with such a solution recording/managing the real-time navigation data.

The standardization for high-density read-only optical disks such as the Blu-ray ROM (BD-ROM) is still under way.

An effective data structure for managing reproduction of video and audio data recorded on the high-density read-only optical disk such as a BD-ROM is not yet available.

SUMMARY OF THE INVENTION

The invention is directed to a recording medium having a data structure for managing reproduction of video data recorded on the recording medium. The recording medium having at least one navigation area for storing navigation management information used in managing real-time reproduction path video data recorded on the recording medium. The navigation management information includes at least one navigation unit that includes a plurality of video data packets and a plurality of real-time navigation packets.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 2:
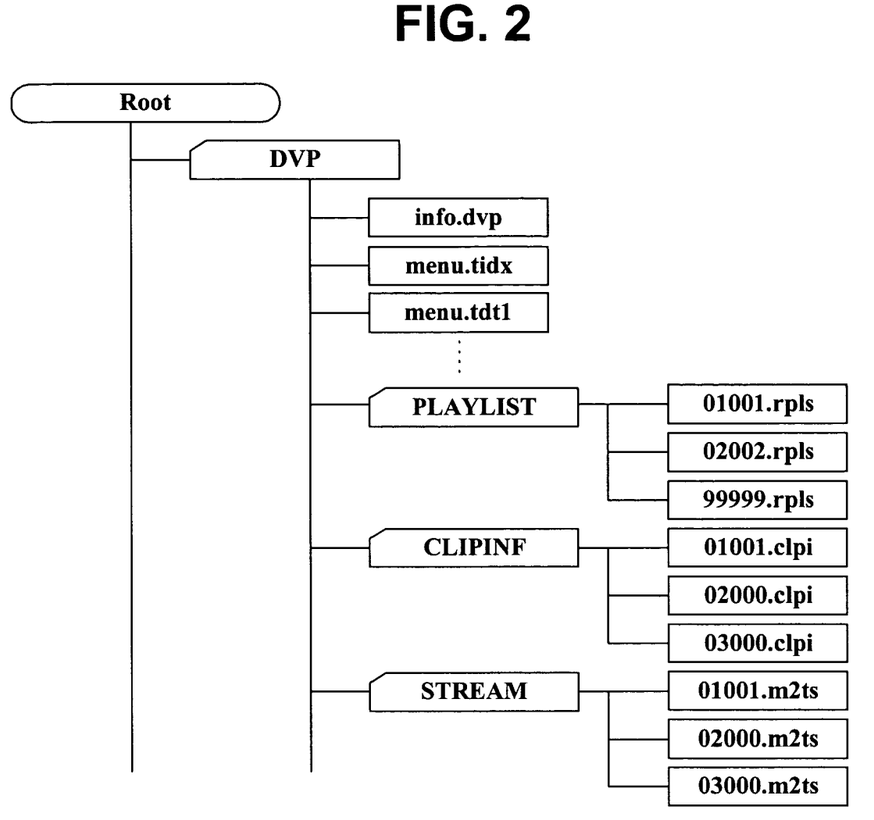
FIG. 2 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

Figure 3:
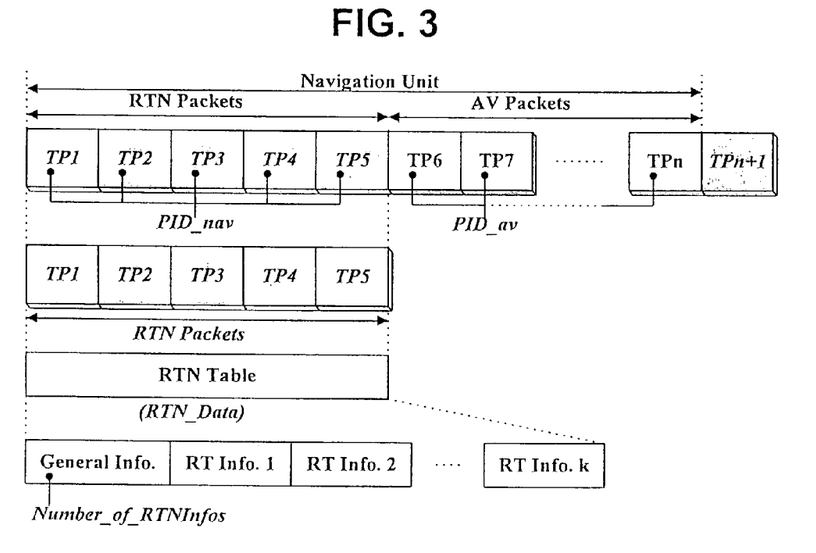
FIGS. 3 and 4 are views illustrating RTN (Real Time Navigation) data packets in a recording medium file or data structure in a high-density optical disk in accordance with a first preferred embodiment of the present invention.

FIG. 3 is a view illustrating the appearance of an audio/video stream according to a first embodiment of the invention having real-time navigation (RTN) data packets for use in a recording medium and method for recording, reproducing and managing RTN data on a high-density optical disk.

Navigation data is a collection of information that determines how physical data is accessed. Access and interactive control playback is controlled by using the navigation data. There are essentially five levels of navigation information. The video manager information controls the video title sets and the title menu. The video title-set information controls the titles and menus in a video-set title. The program chain information controls access to components of a program chain. Presentation control information is stored in packets dispersed throughout the data stream, that controls menu display and program presentation in real time. Finally, data search information, which is also stored in packets scattered in the data stream, control forward/reverse scanning and seamless branching.

With reference to FIG. 3, the data stream shown is divided into navigation units having both RTN packets and AV packets. TPs having RTN information ("RTN packets") are sequentially and successively recorded in a header portion of the navigation unit. As shown in FIG. 3, sequential recording of the RTN packets is preferable where the number of RTN packets contained in the navigation unit is fixed to a prescribed number.

Figure 4:
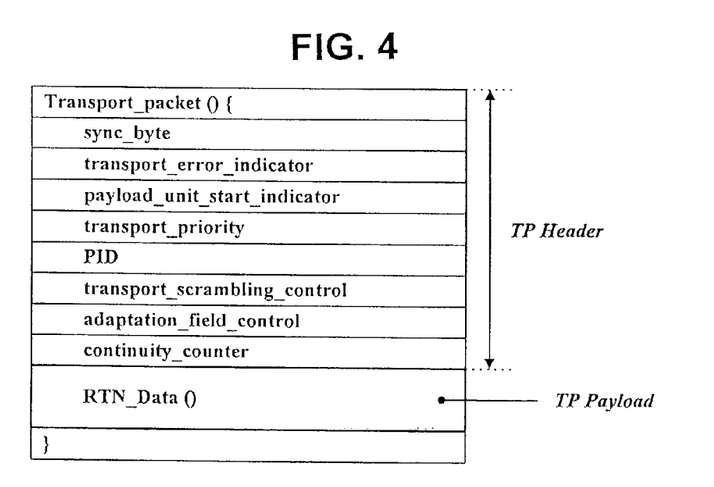

FIG. 4 shows a format for a transport packet having RTN information. The TP may include a header with synchronous byte information 'sync_byte', payload unit start indicator information 'payload_unit_start_indicator', transport priority information 'transport_priority', packet ID information 'PID', transport scrambling control information 'transport_scrambling_control', adaptation field control information 'adaptation_field_control', and continuity counter information 'continuity_counter'. The TP payload contains RTN data ('RTN_Data') The RTN data includes general management information 'General Info' and a plurality of real-time (RT) playback information 'RT Info1~RT InfoK'. The general management control information 'General Info' may contain data such as 'Number_of_RTNInfos' that is indicative of the number of RT playback information.

Each of the plurality of RTN packets have packet IDs (PIDs) different from those of an A/V data stream contained within the same navigation unit. For example, a unique PID 'PID_nav' is included and recorded on a TP header of a RTN packet, and a unique PID 'PID_av' is included and recorded on a TP header of the A/V data stream.

A RTN Table contains RTN data for each RTN packet in a navigation unit. The RTN Table contains general information including the total number of RTN packets within the navigation unit (Number_of_RTNInfos) followed by a sequential list of RTN data for each RTN packet, as discussed above.

Each of the RTN packets has a recording size of 188 bytes. Where a recording size of the RTN data recorded on a BD-ROM disk is greater than 188 bytes, the RTN packet is divided into a number of transport packets each having a recording size of 188 bytes, and then recorded on the BD-ROM disk with the transport packets.

Figure 5:
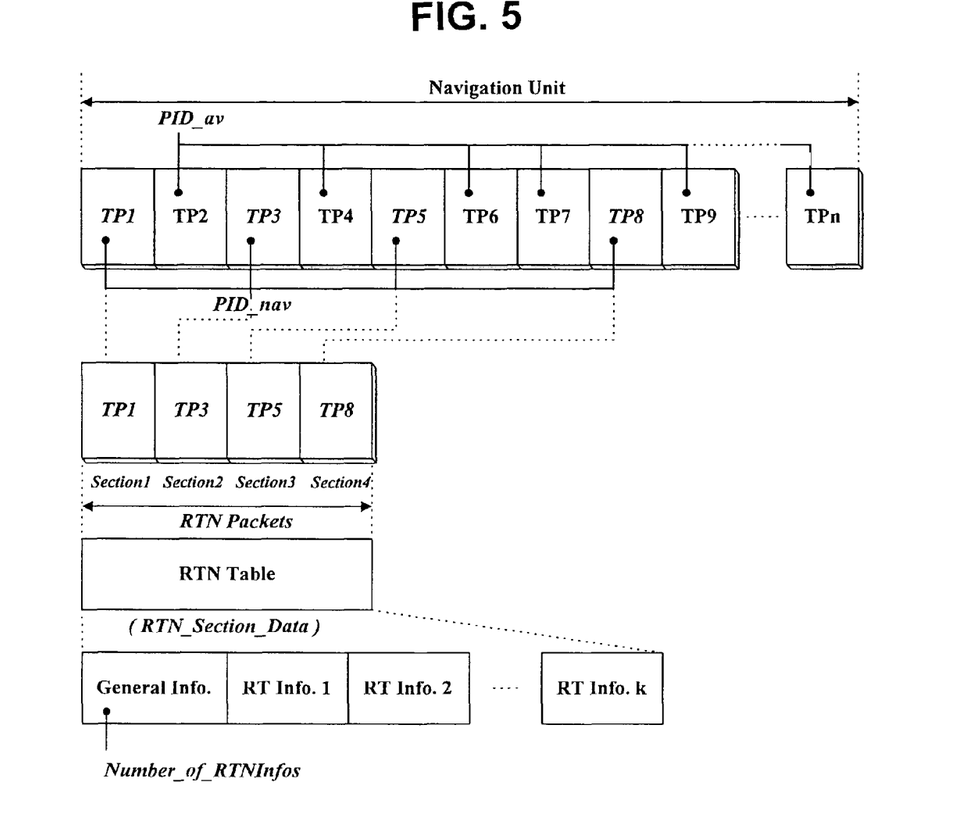
FIGS. 5 and 6 are views illustrating the appearance of RTN data packets for use in a recording medium file or data structure in a high-density optical disk in accordance with another preferred embodiment of the present invention.

FIG. 5 is a view illustrating the data structure of RTN data packets for use in a recording medium and method for recording, reproducing and managing real-time navigation data on a high-density optical disk in accordance with another preferred embodiment of the present invention.

Where a recording size of the RTN data recorded on a BD-ROM disk is greater than 188 bytes, the RTN packet is divided into a number of transport packets (TPs) each having a recording size of 188 bytes, and then recorded on the BD-ROM disk with the transport packets. The plurality of TPs for the RTN packet have packet IDs (PIDs) different from those of an A/V data stream contained in one navigation unit receiving the TPs. For example, a unique PID 'PID_nav' is included and recorded on a TP header of the RTN packet, and a unique PID 'PID_av' is included and recorded on a TP header of the A/V data stream.

As shown in FIG. 5, TPs containing navigation information may be discontinuously recorded in the navigation unit. This discontinuous recording method is preferable where the number of RTN packets contained in the navigation unit is variable. Navigation information from the RTN packets is stored in an RTN table as discussed with regard to the embodiment of FIGS. 3 and 4.

Figure 6:
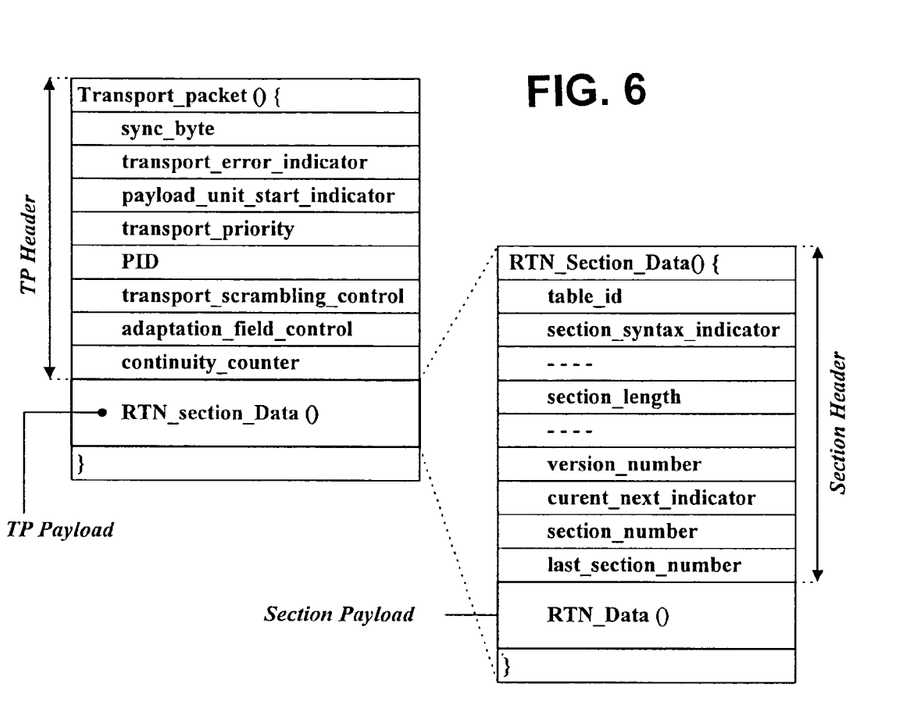

FIG. 6 shows a format of a transport packet for discontinuously recorded RTN packets. The TP header may include synchronous byte information 'syncbyte', transport error indicator information 'transport_error_indicator', payload unit start indicator information 'payload_unit_start_indicator', transport priority information 'transport_priority', packet ID information 'PID', transport scrambling control information 'transport_scrambling_control', adaptation field control information 'adaptation_field_control', and continuity counter information 'continuity_counter'.

In addition, the TP Payload contains, as distinguished from the TP format of FIG. 4, a RTN data section recording area, 'RTN_section_Data( )' that provides relationship information in determining the section number of the RTN packet in the RTN Table. The RTN data is defined to be similar to a PSI (Program Specification Information) section of a general MPEG2 scheme.

As shown in FIG. 6, the RTN_section_data is classified into a section header and a section payload. The section header may include table ID information 'table-id', section syntax indicator information 'section_syntax_indicator', version number information 'version_number', and section number information 'section_number'. In addition the section header also has information relating to the next and last section numbers in the RTN Table.

Finally, the section payload shown in FIG. 6 may contain RTN data 'RTN_Data', similar to the information stored in the TP format discussed above with respect to FIG. 4. The RTN table contains a plurality of RTN data includes general management information 'General Info' and a plurality of real-time (RT) playback control information 'RT Info1~RT InfoK'. The general management information 'General Info' may contain data 'Number_of_RTNInfos' indicative of the number of RT playback information.

Figure 7:
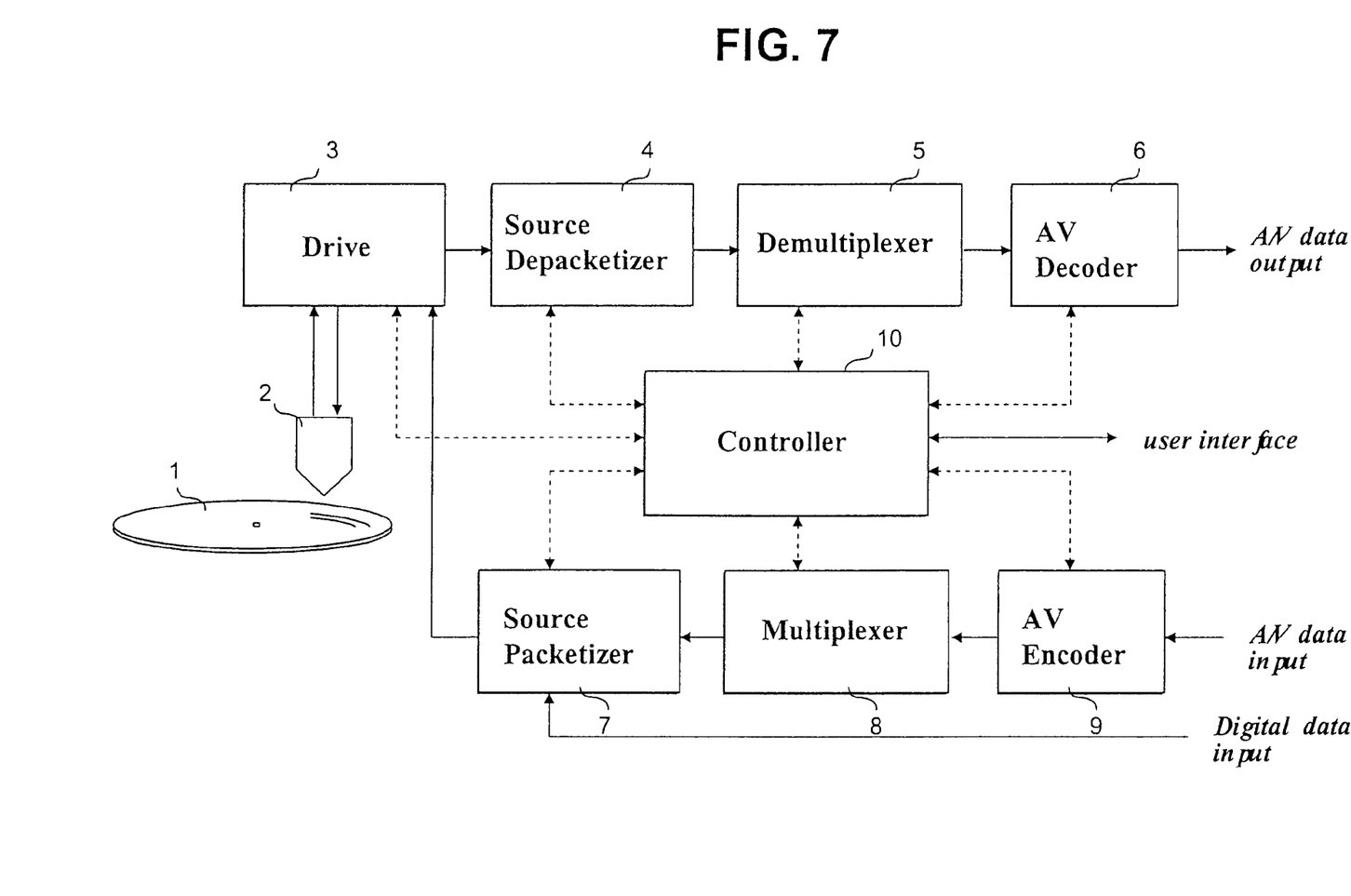
FIG. 7 is a schematic diagram of an embodiment of an optical disk recording and reproduction apparatus of the present invention.

FIG. 7 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management information reproduced from the optical disk, the controller 10 controls the reproduction of the specified path.

While FIG. 7 has been described as a recording and reproducing apparatus, it will be understood that only a recording or only a reproducing apparatus may be provided using those portions of FIG. 7 providing the recording or reproducing function.

Figure 8:
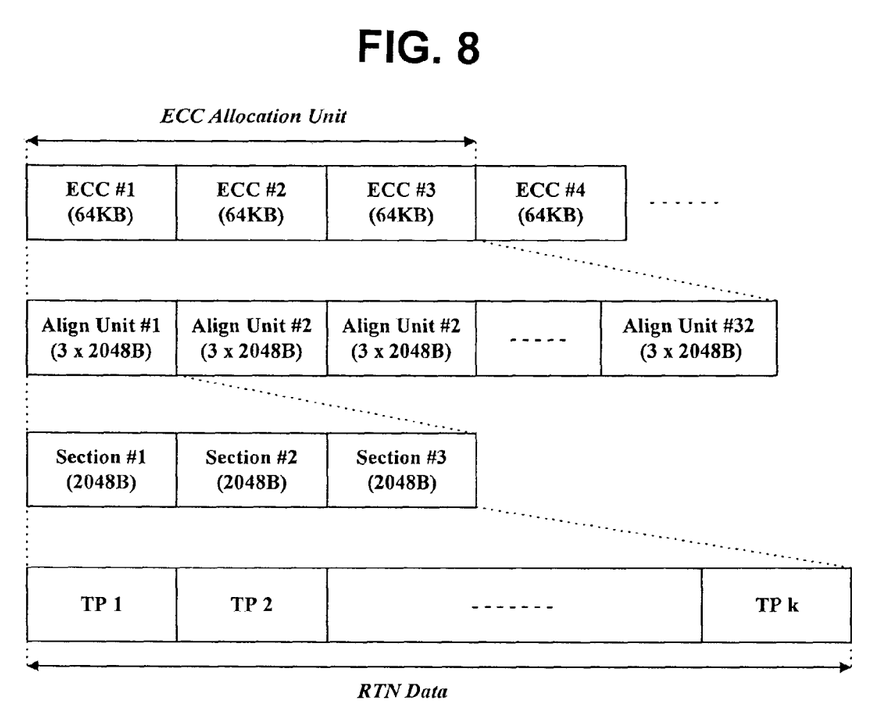
FIG. 8 is a view illustrating a data structure or file in a high-density optical disk showing real-time navigation data aligned with physical recording units according to the present invention.

FIG. 8 shows the relationship between various sections of the recording medium and the disclosed data structure. To more rapidly and accurately search for or access RTN data, the RTN data is aligned in physical recording units each having a prescribed recording size on the BD-ROM disk, and then recorded therein. The RTN data are divided into a plurality of TPs, TP1~TPk, that are recorded in alignment with more than one of the recording medium sections. Each section has a recording size of 2048 bytes. The three sectors correspond to one alignment unit having a recording size of 3×2048 bytes. 32 alignment units correspond to one ECC (Error Correction Code) allocation unit composed of three ECC blocks. Therefore, one RTN table shown in FIGS. 3 to 6 is aligned with more than one sector having a prescribed recording size such that it is aligned with more than one alignment unit, that is aligned with more than one ECC block.

If necessary, the RTN data may be variably combined or assembled with each other. For example, all the RTN tables need not record the RTN data in the same recording format, such that an overall RTN data may be recorded in some RTN tables and the RTN data may be partially recorded in the remaining RTN tables.

In more detail, various kinds of information associated with a navigation unit or GOP unit may be recorded with other navigation information. For example, the navigation information may contain a navigation unit start flag, a GOP unit start flag, position or search information of previous/next navigation units, and position or search information of the next GOP unit, etc., at the start position of the navigation unit corresponding to more than one GOP (Group Of Picture) unit.

In addition, there may also be recorded various kinds of information associated with I-picture and/or P-picture, for example, a picture start flag, a picture data size, and position or search information of previous/next pictures, etc., at the start position of either the I-picture or the P-picture. Further, highlight information similar to those of a BD-RW disk or DVD-ROM disk may be recorded on the start position of the I-picture or the P-picture in navigation units.

As apparent from the above description, the present invention provides a method for recording/managing RTN data on a high-density optical disk, which efficiently records the RTN data on the high-density optical disk and more rapidly accesses the RTN data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tangible recording medium having a data structure for managing reproduction of video data recorded on the medium when read by a computer having a microprocessor, comprising:

at least one navigation area for storing navigation management information for managing real-time reproduction of multiple reproduction path video data recorded on the medium; and wherein at least one navigation unit comprises a plurality of video data packets and a plurality of real-time navigation packets, wherein the plurality of real-time navigation packets comprises a real-time navigation table, the real-time navigation table including real-time navigation data, the real-time navigation data including a plurality of real-time playback information and an indication information for indicating the total number of real-time playback information within the navigation unit, wherein each real-time navigation packet has a same packet identification code that is different from that of each of said plurality of video packets, and wherein the real-time navigation packets are transport packets.

2. The tangible recording medium of claim 1, wherein said plurality of real-time navigation packets are sequentially recorded in the at least one navigation unit, with a fixed number.

3. The tangible recording medium as recited in claim 1, wherein said plurality of real-time navigation packets are discontinuously recorded in the navigation unit, with variable number.

4. The tangible recording medium as recited in claim 1, wherein each of said plurality of real-time navigation packets are physically aligned with at least one corresponding physical recording unit of the storage medium, the physical recording unit having a predetermined size.

5. A method of recording a data structure for managing reproduction of real-lime navigation video data on a recording medium comprising:

recording navigation management information for managing real-time navigation of multiple reproduction path video data in at least one navigation area of the recording medium; and recording at least one navigation unit having a plurality of video packets and real-time navigation packets, wherein the plurality of real-time navigation packets comprises a real-time navigation table, the real-time navigation table including real-time navigation data, the real-time navigation data including a plurality of real-time playback information and an indication information for indicating the total number of real-time playback information within the navigation unit, and wherein each of said plurality of real-time navigation packets has a same packet identification number that is different from each of said plurality of video packets, and wherein the real time navigation packets are transport packets.

6. The method according to claim 5, wherein the multiple reproduction path video data includes different versions of a title.

7. The method of claim 5, wherein each of said plurality of real-time navigation packets are physically aligned with at least one corresponding physical recording unit of the recording medium.

8. A method of reproducing a data structure for managing real-time navigation video data recorded on a recording medium comprising:

reproducing navigation management information for managing real-time navigation of multiple reproduction path video data from at least one navigation area of the recording medium; and reproducing at least one navigation unit having a plurality of video packets and real time navigation packets, wherein the plurality of real-time navigation packets comprises a real-time navigation table, the real-time navigation table including real-time navigation data, the real-time navigation data including a plurality of real-time playback information and an indication information for indicating the total number of real-time playback information within the navigation unit, and wherein each of said plurality of real-time navigation packets has a same packet identification number that is different from each of said plurality of video packets, and wherein the real time navigation packets are transport packets.

9. The method according to claim 8, wherein the multiple reproduction path video data includes different versions of a title.

10. An apparatus for recording a data structure for managing reproduction of at least real-time navigation video data on a recording medium comprising:

a driver configured to drive an optical recording device to record data on the recording medium; and a controller configured to control the driver to record an encoded real-time navigation of multiple reproduction path video data on a recording medium, the controller configured to control the driver to record real-time navigation management information for managing reproduction of the real-time navigation information in at least one navigation unit; and the controller configured to control the driver to record a plurality of real-time navigation packets in the at least one navigation unit and to record a plurality of video packets, wherein the plurality of real-time navigation packets comprises a real-time navigation table, the real-time navigation table including real-time navigation data, the real-time navigation data including a plurality of real-time playback information and an indication information for indicating the total number of real-time playback information within the navigation unit, and wherein each of said plurality of real-time navigation packets has a same packet identification number that is different from each of said plurality of video packets, and wherein the real time navigation packets are transport packets.

11. The apparatus of claim 10, wherein the multiple reproduction path video data includes different versions of a title.

12. An apparatus for recording a data structure for managing reproduction of real-time navigation data on a recording medium, comprising:

a driver configured to drive an optical reproducing device to reproduce data recorded on the recording medium;

a controller configured to control the driver to reproduce navigation management information for managing real-time navigation of multiple reproduction path data from at least one navigation unit of the recording medium; and the controller configured to control the driver to reproducing a plurality of video packets recorded on the recording medium using a plurality of real-time navigation packets contained within the at least one navigation unit, wherein the plurality of real-time navigation packets comprises a real-time navigation table, the real-time navigation table including real-time navigation data, the real-time navigation data including a plurality of real-time playback information and an indication information for indicating the total number of real-time playback information within the navigation unit, and wherein each of said real-time navigation packets has a same packet identification number that is different from each of said plurality of video packets, and wherein the real time navigation packets are transport packets.

13. The apparatus recited in claim 12, wherein each of said plurality of real-time navigation packets are physically aligned with at least one corresponding physical recording unit of the recording medium, and wherein the controller is configured to control the driver to read the real-time navigation packets.

14. The apparatus of claim 12, wherein the multiple reproduction path video data includes different versions of a title.

15. An apparatus for reproducing a data structure for managing reproduction of at least real-time navigation video data recorded on a recording medium comprising:

an optical reproducing device to reproduce data on the recording medium; and a controller to control the optical reproducing device to reproduce an encoded real-time navigation of multiple reproduction path video data, the multiple reproduction path data including different versions of a title from a recording medium, the controller configured to control the optical reproducing device to reproduce a plurality of real-time navigation packets in the at least one navigation unit and to reproduce a plurality of video packets, wherein the plurality of real-time navigation packets comprises a real-time navigation table, the real-time navigation table including real-time navigation data, the real-time navigation data including a plurality of real-time playback information and an indication information for indicating the total number of real-time playback information within the navigation unit, and wherein each of said plurality of real-time navigation packets has a same packet identification number that is different from each of said plurality of video packets, and wherein the real time navigation packets are transport packets.

16. The apparatus of claim 15, wherein the controller is configured to analyze the real-time navigation data to reproduce the real-time navigation video data.

17. The apparatus of claim 15, further comprising:

a demultiplexer configured to separate the real-time navigation packets from the video packets, by using the same packet identification number.

18. The apparatus of claim 17, further comprising:

a decoder configured to decode the encoded video data, demultiplexed by the demultiplexer.

19. The apparatus of claim 15, wherein the controller is further configured to receive a user input for designating a specific path video data.

\* \* \* \* \*